(12) United States Patent
Horn (10) Patent No.: US 9,291,772 B2
(45) Date of Patent: Mar. 22, 2016

(54) WAVEGUIDE SANDWICH SOURCE OF POLARIZATION ENTANGLED PHOTONS

(75) Inventor: Rolf Tjalle Horn, Maryhill (CA)

(73) Assignee: Quspin Technologies Inc., Waterloo, On (CA)

( * ) Notice: Subject to any disclaimer, the term of this patent is extended or adjusted under 35 U.S.C. 154(b) by 319 days.

(21) Appl. No.: 13/884,404

(22) PCT Filed: Nov. 10, 2011

(86) PCT No.: PCT/CA2011/050699
§ 371 (c)(1),
(2), (4) Date: May 9, 2013

(87) PCT Pub. No.: WO2012/061944
PCT Pub. Date: May 18, 2012

(65) Prior Publication Data
US 2013/0230270 A1    Sep. 5, 2013

Related U.S. Application Data (60) Provisional application No. 61/412,010, filed on Nov. 10, 2010.

(51) Int. Cl.
*G02B 6/00* (2006.01)
*G02B 6/126* (2006.01)
*G02F 1/355* (2006.01)
*G02F 1/377* (2006.01)
*G02B 6/122* (2006.01)

(52) U.S. Cl.
CPC ............... *G02B 6/126* (2013.01); *G02B 6/122* (2013.01); *G02F 1/3558* (2013.01); *G02F 1/3775* (2013.01); *G02F 2201/18* (2013.01); *G02F 2203/06* (2013.01); *Y10T 156/10* (2015.01)

(58) Field of Classification Search
None
See application file for complete search history.

(56) References Cited

U.S. PATENT DOCUMENTS

| 6,424,665 | B1 * | 7/2002 | Kwiat ............. H01S 3/1083 359/489.07 |
| 6,862,130 | B2 | 3/2005 | Batchko et al. |
| 7,489,436 | B1 | 2/2009 | Fiorentino et al. |
| 7,570,365 | B2 | 8/2009 | Trifonov et al. |
| 8,173,982 | B2 | 5/2012 | Edamatsu et al. |

(Continued)

FOREIGN PATENT DOCUMENTS

| EP | 1735659 | 12/2006 |
| EP | 2233971 A1 | 9/2010 |

OTHER PUBLICATIONS

Thyagarajan et al., "Generation of polarization-entangled photons using type-II doubly periodically poled lithium niobate waveguides", Physical Review A, vol. 80, No. 5, Dec. 2009, 8 pgs.

(Continued)

*Primary Examiner* — Uyen Chau N Le
*Assistant Examiner* — Chad Smith
(74) *Attorney, Agent, or Firm* — Michael K. Henry; Henry Patent Law Firm PLLC (57) ABSTRACT

The disclosure is directed at a waveguide sandwich which comprises a pair of host materials, each of the host materials housing a component waveguide. The component waveguides are then placed in physical contact with each other to form a composite waveguide thereby producing a waveguide sandwich.

20 Claims, 5 Drawing Sheets (56) References Cited

U.S. PATENT DOCUMENTS 8,222,623 B2 7/2012 Trojek et al.
2009/0028340 A1 1/2009 Trifonov

OTHER PUBLICATIONS

Suhara et al., "Quasi-Phase-Matched Waveguide Devices for Generation of Postselection-Free Polarization-Entangled Twin Photons", IEEE Photonics Technology Letters, vol. 21, No. 15, Aug. 1, 2009, pp. 1096-1098.

Asobe, et al., "Low Crosstalk and Variable Wavelength Conversion using Multiple QPM LiNbO3 Waveguide Module", vol. 45, No. 10, May 7, 2009, 2 pages.

Nosaka et al., "Fabrication and Characterization of Cross-Polarized Twin Photon Generation Device Using Quasi-Phase Matched LiNbO3 Waveguide", Conference Proceedings—Pacific Conf. on Laser and Electro-Optics, CTuK2-2, pp. 171-172, Jul. 30-Aug. 2, 2005.

International Searching Authority (CA), International Search Report and Written Opinion for International Patent App. No. PCT/CA2011/050699, Jan. 30, 2012.

Horn, Rolf, "Waveguide source of Photon Pairs," Doctoral Thesis, University of Waterloo, Waterloo, Ontario, Canada, 2011, 183 pages.

Chinese Patent Office; Office Action received in Chinese Application No. 201180054240.4, dated Apr. 22, 2015, 9 pages. (including English translation, 10 pages).

International Searching Authority, International Preliminary Report on Patentability for App. No. PCT/CA2011/050699, May 23, 2013.

\* cited by examiner

WAVEGUIDE SANDWICH SOURCE OF POLARIZATION ENTANGLED PHOTONS

CROSS-REFERENCE TO RELATED APPLICATIONS

This application claims the benefit of priority of U.S. Provisional Patent Application No. 61/412,010, filed Nov. 10, 2010, which is incorporated herein by reference in its entirety.

FIELD

The present disclosure is generally directed at both classical and quantum optics and quantum information science and more specifically it is directed at an optical waveguide sandwich.

BACKGROUND

Quantum information science is a rapidly growing genre of scientific research and activity. This includes research in the field of entangled photons. A common technique to produce non degenerate pairs (pairs with different frequencies) of polarization entangled photons involves the use of a Sagnac interferometer. This technique involves pumping or directing a non-linear crystal with two counter propagating beams of intense light that is type I phase matched to light centered at roughly half the pump frequency. In one arm of the interferometer, the optical input and output beams have their polarization rotated by approximately 90 degrees. Output light from both arms are combined at a polarizing beam splitter (PBS) where information about the polarization of the light exiting the PBS is erased and quantum entanglement is generated. Light at the pump wavelength is filtered out of both PBS outputs and the signal is split by wavelength. However, the Sagnac source has its drawbacks. Because it is bi-directional, the optical elements need to be tailored for both wavelengths, and embodiments that involve fiber coupled crystals can suffer from phase instabilities.

Another technique of producing entangled photons involves the use of two separate non-linear crystals, one in each arm of a balanced Mach-Zehnder interferometer. In this case, laser pump light entering the interferometer is split into two paths (arms) at a first PBS. As in the Sagnac interferometer, each crystal in each arm facilitates the production of photon pairs via type-I phase matching. In one arm, it is ensured that the polarization of the pairs created there are orthogonal to those that might be created in the other arm. Recombining the paths at a second PBS can create a polarization entangled state. Key drawbacks or difficulties for this solution are that the arms of the interferometer need to be precisely balanced, and that the two crystals need to be as identical as possible to ensure similar spectral properties of their respective biphotons.

It is, therefore, desirable to provide a novel method and apparatus for a waveguide sandwich which overcomes problems in the prior art.

SUMMARY

The disclosure is directed at a method and apparatus for a waveguide sandwich which overcomes some disadvantages of known methods and systems of producing polarization entangled photons. In one embodiment, the disclosure may be seen as a physically flattened Mach-Zehnder interferometer (thereby removing the arms portion of a normal Mach-Zehnder interferometer) or more colloquially, a sandwich source. The present disclosure is directed at a polarization entangled biphoton state that can be produced by focusing laser light at the interface between two host materials, such as down conversion crystals, that are sandwiched on top of one another. The term biphoton refers to two photons that are unable to be described classically. In one embodiment, the wavelength of the laser light being pumped or transmitted is near the second harmonic wavelength with respect to the wavelengths of the desired output biphoton state. In particular, the wavelength of the, pump or input light may be selected for improved entangled photon production and quality, and may depend not only on the host materials or crystals, but on the ability to separate the non-degenerate wavelengths of the biphoton. The crystals preferably support type I or, type II phase or quasi-phase matching of the input wavelength to the wavelengths of the biphoton state. When operating in a Type I phase matching scenario, in order to produce entanglement, the two crystals have their respective down conversion photons emitted with polarizations that are not parallel to each other. In a preferred embodiment, one of the down conversion crystals produces down conversion photons that are polarized perpendicular to those produced by the other crystal. An embodiment of this disclosure involves the use of waveguides to improve the efficiency of production of the entangled state, although it is not necessary. When operating in a Type II phase matching scenario, the biphoton wavelengths are non-degenerate. In one embodiment, the polarization of half of the biphoton pair (having the shorter wavelength) produced by one of the down conversion crystals is perpendicular to the polarization or the half of the biphoton pair (also having the shorter wavelength) produced by the other down conversion crystal.

BRIEF DESCRIPTION OF THE DRAWINGS

Embodiments of the present disclosure will now be described, by way of example only, with reference to the attached Figures.

DETAILED DESCRIPTION

Clarification of the following terms is provided to better understand the description below:

"Lab reference frame" refers generally to the direction of gravity as vertical, and the direction perpendicular to gravity as horizontal.

"Crystal reference frame" refers to the orientation of the bonds within a crystal. For example for uniaxial material, the z or "Z" axis typically refers to the crystal "c" axis or the direction along which is typically found the largest separation between atoms in the crystal. The crystal reference frame does not have to coincide with the lab reference frame.

"Down conversion" refers to a physical process called parametric down conversion. This process can be stimulated or spontaneous, and describes the fissioning of a pump photon into two daughter photons while conserving energy and roughly momentum.

"Type-I" refers to a classification of down conversion where the down converted photons have the same polarization.

"Type-II" refers to a classification of down conversion where the down converted photons have orthogonal polarization "Phase Matching" refers to how well the daughter photons are phase matched to the pump photon. This is often referred to as momentum matching and also plays a significant role in determining what will be the wavelengths of the daughter photons.

"Pumping" refers to directing or injecting laser light or classical light into a host material or waveguide.

The disclosure is directed at a waveguide sandwich. In one embodiment, the disclosure is directed at a waveguide sandwich as a source of polarization entangled photons. In one embodiment, the waveguide sandwich source may include a pair of down conversion crystals which include component waveguides.

Figure 1:
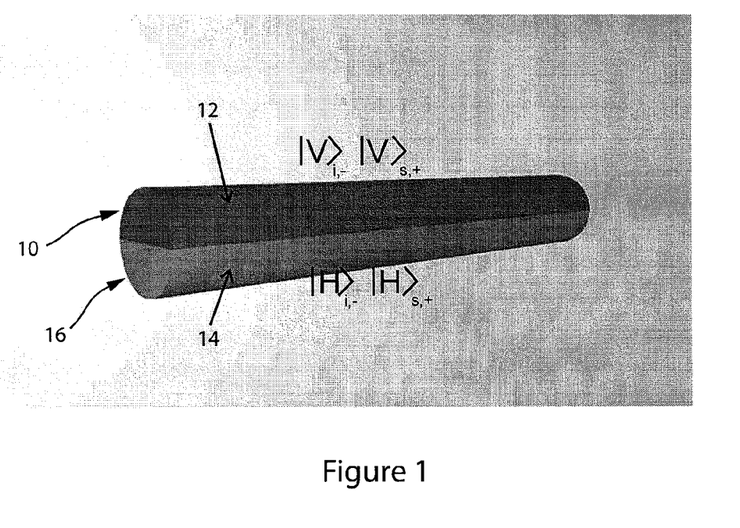
FIG. 1 shows a schematic view of the waveguide sandwich source and how the quantum entanglement may be generated in one embodiment.

FIG. 1 shows a schematic view of the waveguide sandwich source and how the quantum entanglement may be generated in one embodiment.

The component waveguide 12 in the first host material, such as a crystal 10 may be referred to as "component waveguide one". In the Type I case, the surface of component waveguide one is oriented such that the down converted photons produced in component waveguide one have polarizations that are co-linear with the surface normal. Denoting the normal direction to the surface of component waveguide one 12 as Vertical, then this waveguide 12 may produce photons in the state $|V_i, V_s\rangle$, where "V" represents Vertical, and the subscripts i and s denote the designation of "idler" and "signal" photons. Idler and signal are names given to distinguish the pair of photons into ones with the lower and higher frequency (longer and shorter wavelength) respectively.

The waveguide 14 in the second host material, such as a crystal 16 may be referred to as "component waveguide two". The surface of component waveguide two 14 is oriented such that the down converted photons produced in component waveguide two 14 include polarizations that are in the plane of the surface. Denoting the plane of the surface of component waveguide two as Horizontal, then this waveguide 14 may produce photons in the state $|H_i, H_s\rangle$ where "H" stands for Horizontal.

Alternatively, in the Type II case, the down converted photons have polarizations that are orthogonal to each other. Denoting the normal direction to the surface of component waveguide one 12 as Vertical, then this waveguide 12 may produce photons in the state $|H_i, V_s\rangle$ where "H" represents horizontal and "V" represents Vertical, and the subscripts i, s denote the designation of "idler" and "signal" photons.

Further, for the Type II case, denoting the plane of the surface of component waveguide two as Horizontal, then this waveguide 14 may produce photons in the state $|V_i, H_s\rangle$ where "H" represents Horizontal and "V" represents Vertical.

The two crystals 10 and 16 are sandwiched together, one on top of the other, such that component waveguide one (12) and component waveguide two (14) are connected, preferably physically, and in one embodiment, on top of one another. They are aligned optically to form a single "composite waveguide". As these component waveguides combine to form the composite waveguide, then the composite waveguide may produce pairs of photons (through the down conversion process) in either of the entangled states (subject to appropriate normalization $(|H_i H_s\rangle + e^{i\Theta}|V_i V_s\rangle)$ or $(|H_i V_s\rangle + e^{i\Theta}|V_i H_s\rangle)$) where $\Theta$ is an arbitrary phase. To improve the contact between the two host materials, or crystals, an adhesive may be applied to the two mating surfaces. In order to further improve the contact, the mating surfaces of the two crystals 10 and 16 may be polished to provide smoother mating surfaces.

To create an entangled state using the composite waveguide, distinguishing information concerning which component waveguide is responsible for creating any particular photon or photon pair is removed. One way to do this is to have the component waveguides as identical as possible. To this end, in one embodiment of the disclosure, host materials, or crystals of the same material with the same phase matching condition are used. In some cases, even if the two component waveguides are fabricated from the same material, there may still exist some differences, particularly with respect to the phase matching condition. One way to compensate for this difference is to temperature tune the phase matching condition for one of the two component waveguides 12 or 14. This may be accomplished with a thermo-electric cooler (TEC) that may be attached to one of the down conversion crystals 10 or 16. A second method of tuning is to fabricate multiple component waveguides on one of the down conversion crystals, each with a slightly different phase matching condition. This may be accomplished, for example, in periodically poled crystals, by varying the poling periods of each of the component waveguides. As the phase matching condition for component waveguides can be tested, it may be possible to select the most appropriate component waveguides from each down conversion crystal in crystals which have multiple waveguides present. These component waveguides can then be sandwiched to form the composite waveguide. Generally, the required input or "pump" light necessary to excite the down conversion process should be linearly polarized in some direction. Due to an approximate 90 degree rotation of the crystal orientation of one of the component waveguides with respect to the other, to excite both component waveguides simultaneously, the transmitted light for the composite waveguide is preferably polarized approximately half way between that required to optimally excite either of the individual component waveguides. For simplicity, this direction will be referred to as the 45 degree direction.

In some cases, it may be possible that a second piece of distinguishing information concerning where the photon pair is produced may arise from the different spatial location of the optical modes emerging from the composite waveguide. This is due to the physically distinct location of the component waveguides, and may degrade the quality of the entanglement produced by the sandwich. One way to remove this information is to couple both of the modes in the emerging light into a single mode fiber, thereby eliminating this "location" information. Distinguishing information may generally arise if the physical gap between the component waveguides cannot be made small enough. In the case that the physical gap between the component waveguides is greater than a threshold value, there will be reduced coupling, both of the laser pump light into the composite waveguide, and of the subsequent down converted light out of the composite waveguide into fiber. There are a few ways to increase the coupling, a thin beam displacer (such as calcite or any other optical material suitable for displacing the beam based on polarization) can be included at an end of the composite waveguide to displace the light exiting from one of the component waveguides so that it emerges from the same physical point as light exiting the other component waveguide. A second way is to add index matching gel into the gap between the host materials or crystals. The gel assists to optically bond the component waveguides, thereby allowing light from each component waveguide to mix with the other. In this way, the amount of entangled light emitting from the composite waveguide may be increased or possibly optimized. A third way would be to polish the mating surfaces of the two crystals to flatten or smooth out the mating surfaces. This technique can serve to bring the component waveguides closer to the surface or to make the sandwich interface as flat as possible or both.

Another method to facilitate improved coupling may be to fabricate the component waveguides in such a way that the composite waveguide behaves as a single mode waveguide. In this embodiment, the component waveguides may be fabricated or selected such that the core size (the region where the light is confined) of each component waveguide is approximately half of its normal size for single mode operation. One can do this by tailoring the selected depth and width of the component waveguides thereby resulting in a composite waveguide eigenmode or "sandwich mode" to more closely approximate that of a single mode waveguide. The potential coupling efficiency to single mode fiber at the output may also be improved.

There may arise a dispersion condition whereby the photons produced in one of the component waveguides will travel at a different speed than those produced in the other component waveguide. This effect is expected to be minimal. Such modal dispersion may be compensated for by using additional optical elements or dispersion compensation techniques.

The wavelength of the light being transmitted into the waveguide sandwich may also be tuned to excite the component waveguides at threshold values which may include an optimal wavelength value. Optimal in the sense of producing the most useful 'visible' rate of entangled photon pairs. One advantage of the current disclosure si that the composite waveguide may be seen as more compact and stable and may be directly fiber coupled at both of the input and output ends or facets of the sandwich. This either eliminates or lessens the length of the 'arms' of the interferometric methods described in the background. By using a dichroic fiber splitter on the output, useful non-degenerate polarization entangled photons can be achieved, almost completely (save the non-linear crystal) in fiber and in a phase stable manner. The result is an extremely simple, robust and compact source of non-degenerate polarization entangled photons.

In principle, the waveguide sandwich is not limited to waveguides, but can be used with bulk material, where instead of coupling light into component waveguides, light may be focused approximately over the center of the two mating surfaces between the two crystals.

The waveguide sandwich material is not limited to a specific material but to any non-linear material, such as periodically poled lithium niobate (PPLN), periodically poled Potassium Titanyl Phosphate (PPKTP), or Beta-Barium Borate (BBO). Whatever host material is chosen, it would be beneficial to satisfy the required phase matching needed to produce entangled photons. The waveguide sandwich as described is preferably for use with type I or Type II phase matching and can be degenerate or non-degenerate.

In one embodiment, the waveguide sandwich may be used for any application that requires a non-degenerate entangled photons where the desired wavelengths are phase matchable in the host materials, or down conversion crystals. As well, the waveguide sandwich may be used in reverse, to generate harmonic light.

Figure 2A:
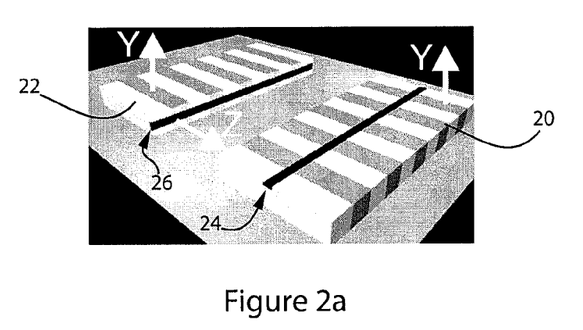
FIG. 2 is a flowchart outlining a first method of how to fabricate the waveguide sandwich source.
Figure 2B:
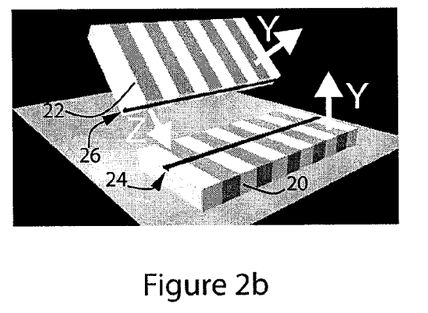
Figure 2C:
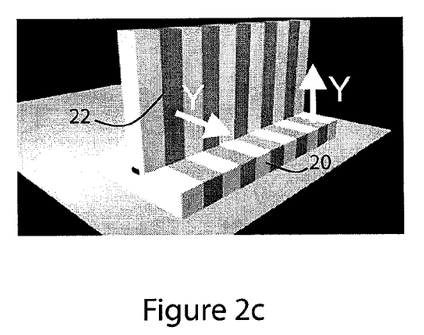

FIGS. 2a to 2c are directed at figures which illustrate one method of producing a waveguide sandwich, or waveguide sandwich source. The method is directed at the integration of a pair of host materials, such as crystals 20 and 22, one crystal 20 having a Y-axis directed waveguide surface, or component waveguide, 24 and the other 22 having a Z-axis oriented waveguide surface, or component waveguide 26 (as outlined in FIG. 2a). In the current embodiment, the integration of the two crystals forms a T-shaped source. The T is meant to clarify the crystal orientation difference between the two component waveguides that make up the composite waveguide. In producing the waveguide sandwich, what should be kept in mind is the idea of making a composite waveguide from two component waveguides where one component waveguide is adjacent to the other component waveguide. In a simplest case, each of the two component waveguides are themselves waveguides made from the same material. One half (in this case the top half) satisfies type I or Type II phase matching such that the signal photon is say, without loss of generality, vertically polarized in the lab reference frame. The other (bottom) half satisfies type I or Type II phase matching where the signal photon is polarized 90 degrees with respect to the signal photon in the top half—in this case, horizontally polarized in the lab reference frame, such as discussed in FIG. 1.

To fabricate the T waveguide sandwich, or waveguide sandwich source, initially, two rectangular non-linear crystals that each facilitate type-I or Type II down conversion are prepared or produced having their largest surface normal directed along one direction, such as the Y crystal direction. While not necessarily manufactured from the same material, in a preferred embodiment, the crystals are of the same material. In one of the crystals, or the first crystal, the first component waveguide is fabricated on the short side of the crystal, where its waveguide air surface is oriented in a first direction, such as the Z direction. In the second crystal, its component waveguide air surface is oriented in a second direction which is perpendicular to the first direction. In the figure, the second crystal has a waveguide with its surface oriented in the Y-direction. One of the crystals may then be flipped 90 degrees and placed atop the other crystal such that the component waveguides align directly over top of one another (for the length of the crystal) to form a composite waveguide. The two crystals may then be adhered together, such as with epoxy or glue or other known methods of adhering crystals.

The composite waveguide may be directly fiber coupled (or free space coupled) and pumped unidirectionally with second harmonic light polarized at approximately 45 degrees between the expected output polarizations of the down converted light from each component waveguide.

It is an aspect to combine two waveguides that each facilitate similarly oriented (with respect to the crystal reference frame) Type I or Type II phase matching processes. In one embodiment, the combining or sandwiching process includes mating the two waveguides together, preferably physically. With respect to FIGS. 2a to 2c, this may be accomplished as follows: a) fabricate a waveguide in the material of choice which can mediate a type I or Type II phase matching interaction (FIG. 2a). Whatever this waveguide looks like, it would be beneficial to include a surface (the side of the waveguide that is exposed to air) that is oriented in a particular direction with respect to the underlying crystal axes; b) fabricate a second waveguide in the same material of choice satisfying the same type I or Type II phase matching interaction but orient it so that its surface is oriented 90 degrees with respect to the crystal orientation of the first waveguide (FIG. 2b); and then c) externally or physically rotate one of the waveguides by 90 degrees and mate its surface with the other waveguide while ensuring that both waveguides lie directly on top of one another (FIG. 2c). Once aligned in this manner, apply appropriate adhesive material or holding mechanisms to make the composite waveguide robust and physically stable so that the two waveguides do not move with respect to one another. Then optically couple and adhere a suitable input fiber to one end and call it the input end. Optically couple and adhere a single mode fiber for the entangled photon wavelength at the other end. Pump the sample at the input end with a suitably chosen laser—say a diode laser—at the appropriate wavelength (such as near the second harmonic) and with the appropriate polarization (such as near 45 degrees) so that it excites the down conversion reaction in both component waveguides equally (in the sense that the two waveguides produce roughly the same number of photon pairs). At the output end, filter the pump mode and split the entangled photons based on wavelength all in fiber. The result is a robust, small footprint, fiber coupled entangled photon source.

In the alignment of the crystals, the alignment may be facilitated with the use of an optical waveguide test and positioning bed. While different types of systems are contemplated, such as ones that include multi-axis positioning equipment with suitable resolution and precision, this is simply one example of how the crystals may be aligned.

Another aspect of the formation of a waveguide sandwich is the tuning of the waveguides. The waveguides may be tuned by selecting the dimensions of the component waveguides and their inherent orientation, however, the selection of these dimensions should not be seen as limiting to the waveguides and the crystals as this dimension selection process relates to improving the tuning of the waveguide sandwich and not for the production of a waveguide sandwich.

With respect to tuning, there is likely be an optimal waveguide profile for each component waveguide (most likely smaller than a standard waveguide) so that the composite waveguide behaves more like a single waveguide and couples better to a single mode fiber. By coupling the output to a single mode fiber, all distinguishing information concerning which guide the emitted photons emerged from will be lost and entanglement can be generated/preserved. If coupling is better for one of the component guides, the input polarization can be tuned away from 45 degrees to favor the lesser coupled waveguide in order to balance the process. If one of the component waveguides phase matches differently than the other, the difference can often be made negligible by changing the temperature of the component waveguide, or by carefully selecting another waveguide. This once again restores the balance between the two component waveguides and improves the quality of the entanglement. In the case that it becomes impossible to mate the two waveguides together, the use of a beam displacement mechanism—eg. Calcite—may be needed to make the device practical. For example, a piece of calcite may be optically glued to the ends of the device and polished down to the appropriate thickness so that light exiting both waveguides will do so in an overlapping sense. Calcite may be used on one or both sides of the device. The drawback is that this will usually require some form of time or phase compensation to account for the added path length difference between light requiring displacement and light that isn't displaced. Such dispersion compensation is required because it becomes more likely to be able to tell which component waveguide produced a pair of photons based on their future arrival time at a photon detector. Ideally, there would be no need for such additional displacing material. Other tuning possibilities can come from mating one component waveguide from one material to another from a different material.

Figure 3:
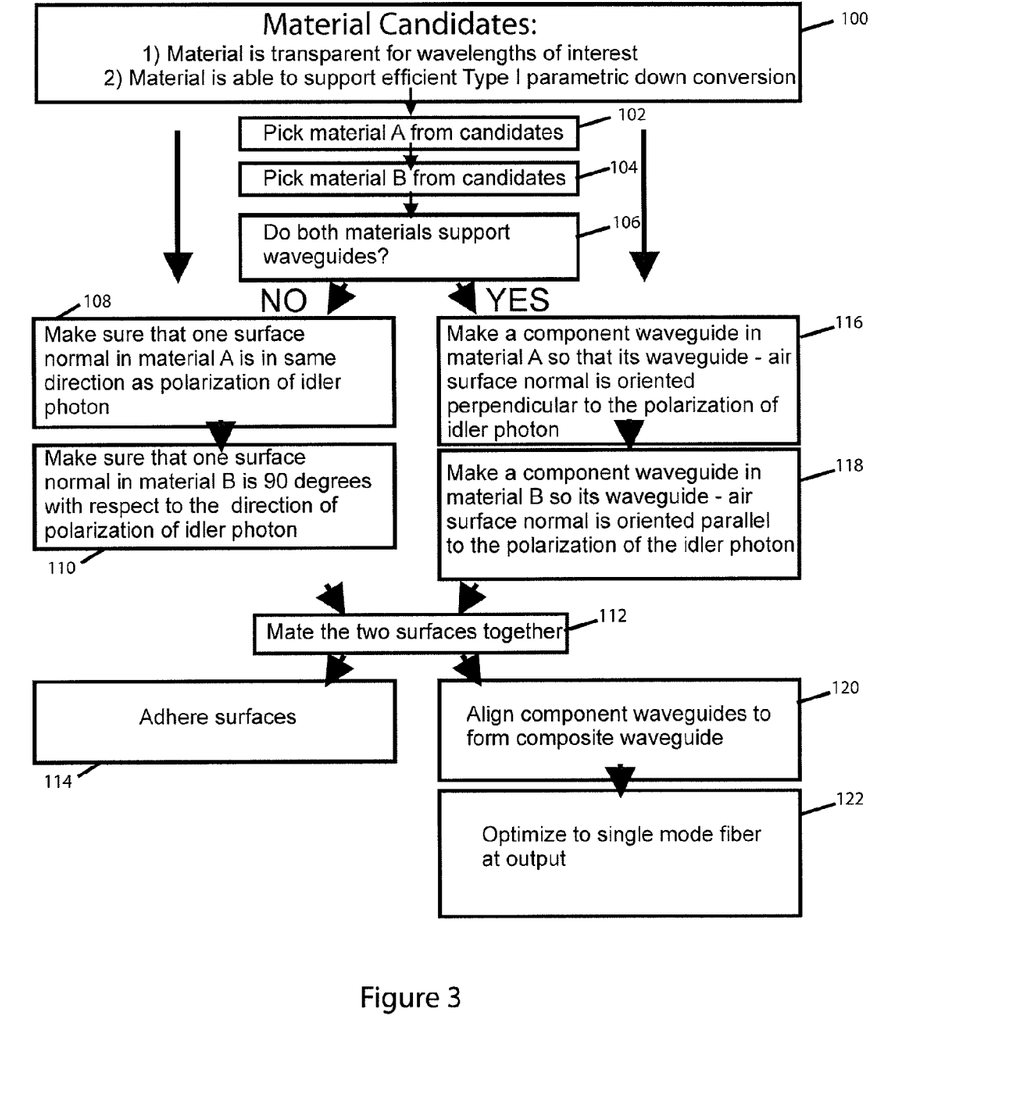
FIG. 3 is a flow chart of another embodiment of building the sandwich source.

Turning to FIG. 3, another embodiment of a method of producing a waveguide sandwich is shown. The flowchart of FIG. 3 includes the steps of creating the crystals, however, it will be understood that the crystals may be simply purchased provided they have the correct characteristics which include, but are not limited to, a pair of crystals having waveguides capable of producing type-I or Type II down conversion light. Furthermore, it is beneficial that the phase matching characteristics of the two crystals are identical or close to identical, and that the two materials have similar if not identical linear optical properties (eg. same index of refraction for wavelengths used).

In the flowchart of FIG. 3, initially, a determination of host materials which may be suitable for the formation of a crystal, or host for a component waveguide, is performed 100. Some characteristics of the crystals may include, but are not limited to, being transparent for the wavelengths of interested or being able to support efficient parametric down conversion. Examples of non-linear materials include, but are not limited to, Lithium Niobate (LiNbO3), Potassium Titanyl Phosphate (KTiOPO4), Potassium Titanyl Arsenate (KTiOAsO4), Lithium Iodate (LiIO3), Lithium Tantalate (LiTaO3), Gallium Arsenide (GaAs) and Aluminium Gallium Arsenide (AlGaAs).

After the suitable materials are determined, a first crystal is produced after the selection of a first material, or material A 102. A second crystal is then produced after the selection of a second material, or material B 104.

A check is then performed to determine if both of the materials selected are capable of supporting waveguides 106. If the materials are capable of supporting waveguides, a component waveguide is fabricated from material A 116 such that its waveguide-air surface normal is oriented perpendicular to that of the polarization of, for example, the idler photon produced in its down conversion photons. A second component waveguide is fabricated from material B 118 such that its waveguide-air surface normal is oriented parallel to that of the polarization of the idler photon produced in its down conversion photons. The two waveguide-air surfaces from each of the component waveguides are brought together 112. IN one embodiment, the waveguides are then aligned to be adjacent to each other and on top of one other for the entire length of the crystal 120. This mates the waveguides and forms the waveguide sandwich. The waveguide sandwich may then be optically optimized to a single mode fiber at its output and either a single or multi-mode fiber at its input 122. In order to stabilize the waveguide sandwich, the two materials may be bonded using an adhesive such as, but not limited to, optical cement. An index matching gel may be included prior to mating the two surfaces together 112 in order to improve fiber coupling and/or to improve the polarization entanglement of the photons. The component waveguides may then be fixed together to make the waveguide sandwich more robust. 114. In one embodiment, the materials may be fixed together with optical cement or epoxy, however any adhesive or method of adhering crystals together are contemplated. The waveguide sandwich may also be used in a free space configuration with no fiber coupling.

If both host materials are unable to support waveguides, then a simple sandwich of two crystals can be created whereby the mating surface of the first crystal material, material A, has its normal parallel to the polarization of, for example, the idler photon produced in its down conversion photons 108, and the mating surface of the second crystal material, material B, has its normal perpendicular to the polarization of the idler photon produced in its down conversion photons 110. The mating surfaces can then be mated together 112 and fixed using optical cement or similar purpose glue/epoxy. The device can then be used in a free space configuration 114.

Figure 4:
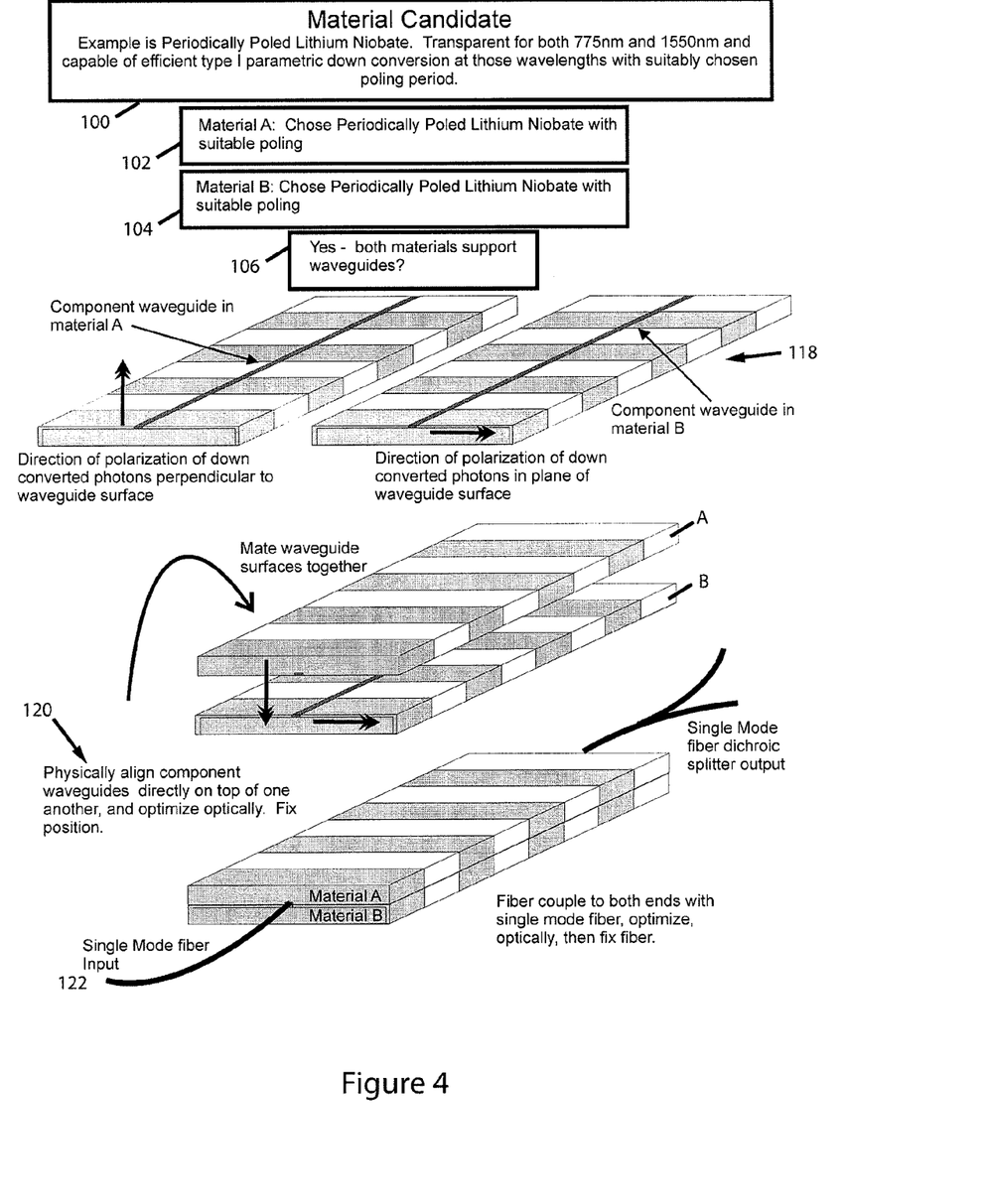
FIG. 4 is a schematic diagram illustrating an example of the method of FIG. 3.

FIG. 4 is a combination flowchart and schematic diagram showing an example of the flowchart of FIG. 3.

As shown in a specific embodiment of FIG. 4, the host material is selected as Periodically Poled Lithium Niobate (PPLN) as it is transparent for both 775 nm and 1550 nm and capable of efficient type 1 parametric down conversion at those wavelengths with a suitably chosen poling period 100.

PPLN is then selected as Material A 102 and Material B 104. As PPLN is capable of supporting waveguides 106, therefore a component waveguide is created in Material A 116 and a component waveguide is created in material B 118. The double pointed arrow in 116 reflects the direction of polarization of down converted photons perpendicular to the waveguide surface (eg. Z-cut PPLN) while the double pointed arrow in 118 shows the direction of polarization of down converted photons in the plane of the waveguide surface (eg. Y-cut PPLN). The two materials are then combined by mating the two surfaces together 112 (where Material A and Material B are marked). When the two surfaces are mated, the two component waveguides are aligned, or may be aligned, with one on top of the other and then their position is fixed 120 such as with an adhesive. Designating one end of the waveguide sandwich as the output end (and the other as the input end), single mode fiber may then be connected to the output end and single or multimode fiber may be connected to the input end.

The manufacture of crystals having component waveguides is not discussed in detail herein, however, this process will be understood.

Figure 5:
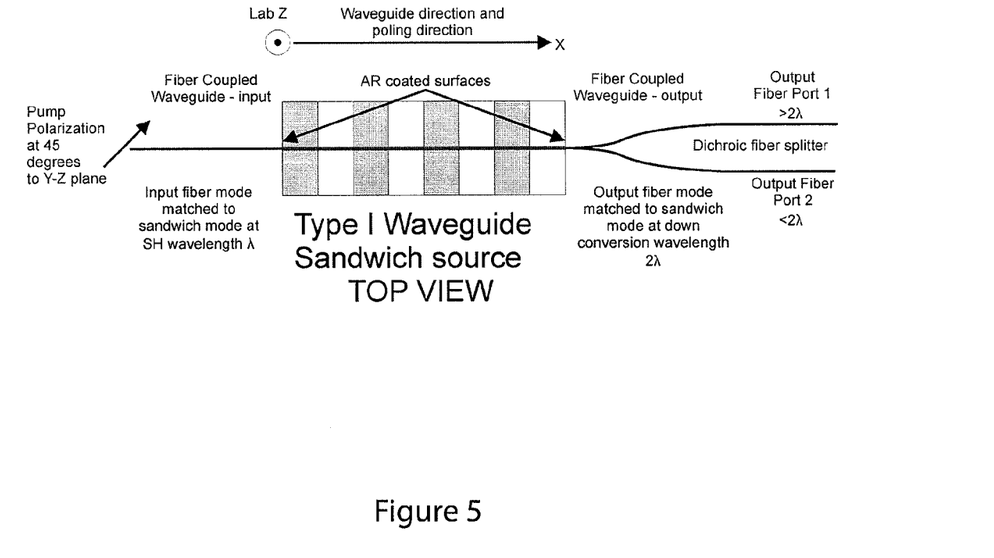
FIG. 5 is a schematic diagram of a waveguide sandwich source.

FIG. 5 is a schematic diagram of a top view of the waveguide sandwich, or source, complete with fiber coupling (based on the process disclosed in FIG. 4). In this figure, the waveguides are drawn in to more clearly reflect the disclosure, even though it is unlikely that they would be visible.

There are many applications and uses for the waveguide sandwich, or waveguide sandwich source disclosed herein. For example, the waveguide sandwich may be used in quantum information science protocols, linear optics quantum computing, single and multi photon experiments or it may be used as the quantum resource for entanglement and/or single photon based Quantum Key Distribution (QKD). QKD is a method for distributing secure keys practically and thus can enable information theoretic secure data transmission via one-time pad encryption. One advantage of the waveguide sandwich source is that it improves on the stability and compactness of current entangled photon sources used in experiments dealing with entanglement and entanglement based QKD schemes.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art without departing from the scope, which is defined solely by the claims appended hereto.

What is claimed is:

1. A system comprising:
   a sandwich source that produces polarization entangled photons in response to light pumped into the sandwich source at an interface between a first crystal and a second crystal, the sandwich source comprising:
      the first crystal having a first mating surface; and
      the second crystal having a second mating surface, the first mating surface mated to the second mating surface at the interface between the first crystal and the second crystal, the interface extending from an input end of the sandwich source to an output end of the sandwich source;
   an input optically coupled to the input end of the sandwich source to pump light into the sandwich source at the interface; and
   an output optically coupled to the output end of the sandwich source to collect the polarization entangled photons produced by the sandwich source.

2. The system of claim 1, wherein the first crystal is physically bonded to the second crystal at the interface.

3. The system of claim 2, wherein the first crystal is physically bonded to the second crystal by at least one of an adhesive or a gel at the interface.

4. The system of claim 1, wherein the first crystal comprises a first component waveguide in a first host material, the second crystal comprises a second component waveguide in a second host material, and the sandwich source comprises a composite waveguide formed by the first component waveguide and the second component waveguide.

5. The system of claim 1, wherein the first crystal comprises a first bulk material and the second crystal comprises a second bulk material, and the interface comprises an interface between the first bulk material and the second bulk material.

6. The system of claim 1, wherein the input comprises an input fiber and the output comprises an output fiber.

7. The system of claim 6, wherein the output fiber comprises a single mode fiber.

8. The system of claim 1, further comprising a beam displacer at one or more of the input end of the sandwich source or the output end of the sandwich source.

9. The system of claim 1, wherein the first crystal comprises a first down conversion crystal and the second crystal comprises a second down conversion crystal.

10. The system of claim 9, wherein the first crystal and the second crystal have the same phase matching conditions.

11. The system of claim 9, wherein the first down conversion crystal facilitates Type-I down conversion, the second down conversion crystal facilitates Type-I down conversion, and the polarization entangled photons are produced by Type-I down conversion in the first and second down conversion crystals.

12. The system of claim 9, wherein the first down conversion crystal facilitates Type-II down conversion, the second down conversion crystal facilitates Type-II down conversion, and the polarization entangled photons are produced by Type-II down conversion in the first and second down conversion crystals.

13. The system of claim 9, wherein the first mating surface has its normal parallel to the polarization of idler photons produced by down conversion in the first crystal, and the second mating surface has its normal perpendicular to the polarization of idler photon produced down conversion in the second crystal.

14. The system of claim 1, at least one of the first crystal or the second crystal comprises at least one of Lithium Niobate (LiNbO3), Potassium Titanyl Phosphate (KTiOPO4), Potassium Titanyle Arsenate (KTiOAsO4), Lithium iodate (LiIO3), Lithium Tantalate (LiTaO3), Gallium Arsenide (GaAs) or Aluminium Gallium Arsenide (AlGaAs).

15. A method comprising:
pumping light into an input end of a sandwich source, the sandwich source comprising:
a first crystal having a first mating surface; and
a second crystal having a second mating surface, the first mating surface mated to the second mating surface at an interface between the first crystal and the second crystal, the interface extending from the input end of the sandwich source to an output end of the sandwich source;
producing polarization entangled photons in the sandwich source in response to light pumped into the sandwich source at the interface between the first crystal and the second crystal; and
collecting the polarization entangled photons from the output end of the sandwich source.

16. The method of claim 15, wherein the polarization entangled photons are produced in the sandwich source by down conversion in the first crystal and the second crystal.

17. The method of claim 15, wherein pumping light into an input end of a sandwich source comprises focusing laser light at the interface, and producing polarization entangled photons comprises producing a polarization entangled biphoton state.

18. The method of claim 15, wherein the first crystal comprises a first component waveguide in a first host material, the second crystal comprises a second component waveguide in a second host material, and the sandwich source comprises a composite waveguide formed by the first component waveguide and the second component waveguide.

19. The method of claim 15, wherein the first crystal comprises a first bulk material and the second crystal comprises a second bulk material, and the interface comprises an interface between the first bulk material and the second bulk material.

20. The method of claim 15, wherein pumping light into the input end comprises pumping light through an input fiber optically coupled to the input end, and collecting the polarization entangled photons comprises collecting the polarization entangled photons through an output fiber optically coupled to the output end.

* * * * *